United States Patent
Tappeiner et al.

(10) Patent No.: US 10,970,527 B2
(45) Date of Patent: Apr. 6, 2021

(54) ROBOT ATTENTION DETECTION

(71) Applicant: Digital Dream Labs, LLC, Pittsburgh, PA (US)

(72) Inventors: Hanns W. Tappeiner, San Francisco, CA (US); Brad Neuman, San Francisco, CA (US); Andrew Neil Stein, San Francisco, CA (US); Lee Crippen, Berkeley, CA (US)

(73) Assignee: Digital Dream Labs, LLC, Pittsburgh, PA (US)

( * ) Notice: Subject to any disclaimer, the term of this patent is extended or adjusted under 35 U.S.C. 154(b) by 0 days.

(21) Appl. No.: 15/694,710

(22) Filed: Sep. 1, 2017

(65) Prior Publication Data

US 2019/0070735 A1 Mar. 7, 2019

(51) Int. Cl.
*B25J 19/02* (2006.01)
*G06K 9/00* (2006.01)
*G06N 3/00* (2006.01)

(52) U.S. Cl.
CPC ........ *G06K 9/00335* (2013.01); *G06N 3/004* (2013.01)

(58) Field of Classification Search
CPC ... B25J 11/001; B25J 11/0015; B25J 11/0005; B25J 9/163; B25J 9/1669; G05D 1/0088; G05D 1/0221; Y10S 901/01; Y10S 901/46; Y10S 901/47; G06N 20/00; G06N 3/004; G06N 3/008; G06N 3/0454
USPC ....... 700/245–264; 345/473; 706/12, 14, 25; 446/175, 268; 901/46, 47
See application file for complete search history.

(56) References Cited

U.S. PATENT DOCUMENTS

| | | | |
|---|---|---|---|
| 9,796,095 B1* | 10/2017 | Hanson | B25J 11/001 |
| 2005/0073907 A1 | 4/2005 | D'Estais | |
| 2009/0319459 A1 | 12/2009 | Breazeal et al. | |
| 2016/0299505 A1 | 10/2016 | Ohara | |
| 2017/0011258 A1 | 1/2017 | Pitre et al. | |
| 2018/0133900 A1* | 5/2018 | Breazeal | B25J 11/0005 |
| 2019/0054626 A1* | 2/2019 | Ide | B25J 9/1669 |

FOREIGN PATENT DOCUMENTS

| | | |
|---|---|---|
| CN | 105291109 | 2/2016 |
| JP | 2007-050461 | 3/2007 |

OTHER PUBLICATIONS

Indiegogo.com [online], "Olly—The First Home Robot With Personality / Indiegogo," Oct. 19, 2017, Retrieved from the Internet: URL <https://www.indiegogo.com/projects/olly-the-first-home-robot-with-personality-innovation#/, >, 14 pages.

(Continued)

*Primary Examiner* — Dalena Tran
(74) *Attorney, Agent, or Firm* — David G. Oberdick

(57) ABSTRACT

A robot that uses sensor inputs for attention activation and corresponding methods, systems, and computer programs encoded on computer storage media. The robot can be configured to compute a plurality of attention signals from sensor inputs and provide the plurality of attention signals as input to the attention level classifier to generate an attention level. If a user is paying attention to the robot based on the generated attention level, the robot selects a behavior to execute based on the current attention level, wherein a behavior comprises one or more coordinated actions to be performed by the robot.

21 Claims, 4 Drawing Sheets

(56) References Cited

OTHER PUBLICATIONS

International Search Report and Written Opinion in Application No. PCT/US2018/049095, dated Dec. 18, 2018, 5 pages.
Laue and Rofer, "Getting Upright: Migrating concepts and software from four-legged to humanoid soccer robots," IEEE-RAS International Conference on Humanoid Robots, Dec. 6, 2006, 7 pages.
Nerdtechy.com [online], "Anki Cozmo Review—The Real-Life Robot with Personality—Nerd Techy," Sep. 10, 2016, [retrieved on Nov. 23, 2018], Retrieved from the Internet: URL<https://nerdtechy.com/anki-cozmo-review> 15 pages.
Brown University, "Research makes robots better at following spoken instructions", Jul. 13, 2017, 11 pages.

* cited by examiner

ROBOT ATTENTION DETECTION

BACKGROUND

This specification relates to robots, and more particularly to robots used for consumer purposes.

A robot is a physical machine that is configured to perform physical actions autonomously or semi-autonomously. Robots have one or more integrated control subsystems that effectuate the physical movement of one or more robotic components in response to particular inputs. Robots can also have one or more integrated sensors that allow the robot to detect particular characteristics of the robot's environment.

Modern day robots are typically electronically controlled by dedicated electronic circuitry, programmable special-purpose or general-purpose processors, or some combination of these. Robots can also have integrated networking hardware that allows the robot to communicate over one or more communications networks, e.g., over Bluetooth, NFC, or WiFi.

Robots are often mobile machines that can operate away from grid-connected power sources and away from wired networking connections. As a result, resource consumption is of particular concern to mobile robots, both in terms of processing power and network bandwidth that is consumed for particular tasks. Therefore, computing power and network bandwidth are often resource bottlenecks when implementing sophisticated modern applications on mobile robots.

SUMMARY

This specification describes how a robot can use integrated sensor inputs and possibly one or more physical actions to determine when a user is paying attention to the robot. Robots have a number of advantages over other computer-controlled systems when it comes to detecting attempts by users to interact with the robot. In particular, robots can perform physical actions to seek out and confirm suspected attempts by users to interact with the robot. This specification also describes how a robot can maintain and update an emotion state to make such attention activations more lifelike and easier to understand.

For example, often a user is paying attention to the robot so that the robot will respond to spoken user input. This specification describes techniques for determining that the user is paying attention to the robot without requiring the user to say any particular wake word commands and possibly before the user even speaks. Then, when the user does speak, the robot can immediately begin natural language processing on the provided input.

The entity providing the user input is typically a person, although the user input can also be provided by other entities. For example, the user input can be provided by an animal, e.g., a pet; another robot; or a computer-controlled system that can produce audio, to name just a few examples.

In this specification, "attention activation" will refer to triggering a transition into an attention state by virtue of the robot selecting attention seeking, confirming, or understanding actions. For example, a robot can perform one or more coordinated actions in response to determining that a user is paying attention to the robot. Such actions often require that the robot to stop performing behaviors for accomplishing other tasks.

The attention state transitions can be incremental. For example, a robot that detects a sound within the audio band of human speech can perform a number of coordinated actions to determine if the audio is coming from a user paying attention to the robot or deserving of the robot's attention. For example, the robot can determine the direction from which the sound came, turn toward the direction of the sound, and use camera imagery to determine whether any human users are detected in the field of view. If so, the robot can record audio and upload/stream such recorded audio to an online natural language processing (NLP) service in order to identify voice commands. Notably, this incremental process prevents the robot from streaming all audio ever captured, which enhances robot performance and battery life, saves network bandwidth, and enhances user privacy and security.

Particular embodiments of the subject matter described in this specification can be implemented so as to realize one or more of the following advantages. A robot can determine that a user is paying attention to the robot without requiring the user to say a wake word. A robot can support multiple different real-valued or enumerated attention levels that correspond to different attention states. The different attention levels help to reduce processing load on the robot, save battery life, and reduce network bandwidth by requiring higher attention levels in order to trigger more expensive operations. This can also provide a privacy benefit for applications that involve uploading audio for natural language processing, images/video for computer vision analysis, or other sensor data for analysis by a remote server which may have more or different computational resources than the robot itself. This can also provide a security benefit by preventing the triggering of audio commands by unauthorized or unrecognized users. In the case of voice input, the attention states reduce the amount of captured audio or video that is needlessly sent to the cloud when a user is not providing user input that requires further natural language processing or visual input processing. A robot can also use a multidimensional emotion state to reduce the computational resources required to determine when a user is paying attention to the robot. The emotion state also helps to simulate emotional responses, which can increase user engagement, make the robot easier to use, make the robot's actions easier to understand, and make the entire interaction more natural and life-like.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
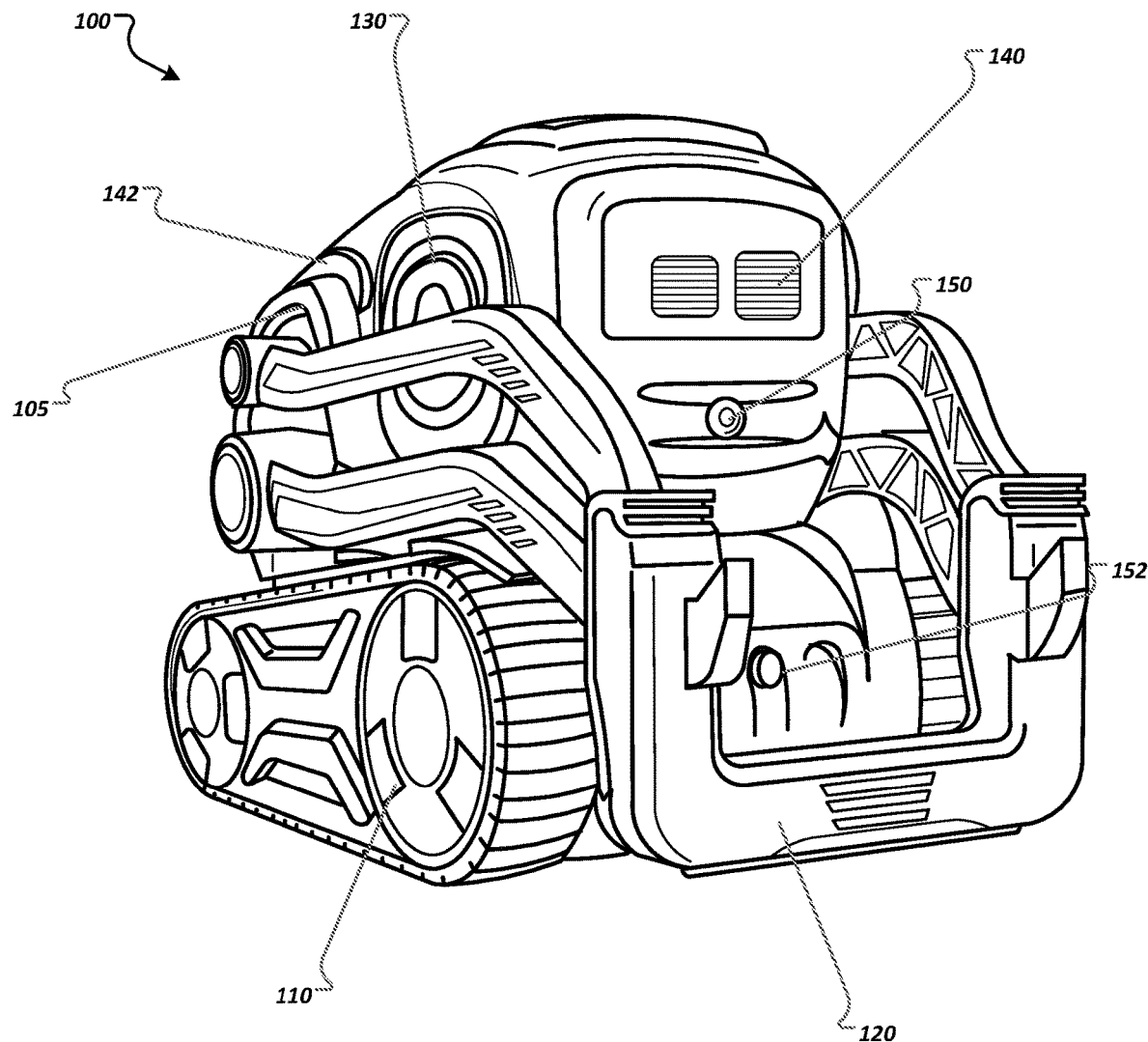
FIG. 1 illustrates an example robot.

FIG. 1 illustrates an example robot 100. The robot 100 is an example of a mobile autonomous robotic system on which the attention activation techniques described in this specification can be implemented. The robot 100 can use the techniques described below for use as a toy or as a personal companion.

The robot 100 generally includes a body 105 and a number of physically moveable components. The components of the robot 100 can house data processing hardware and control hardware of the robot. The physically moveable components of the robot 100 include a propulsion system 110, a lift 120, and a head 130.

The robot 100 also includes integrated output and input subsystems.

The output subsystems can include control subsystems that cause physical movements of robotic components; presentation subsystems that present visual or audio information, e.g., screen displays, lights, and speakers; and communication subsystems that communicate information across one or more communications networks, to name just a few examples.

The control subsystems of the robot 100 include a locomotion subsystem 110. In this example, the locomotion system 110 has wheels and treads. Each wheel subsystem can be independently operated, which allows the robot to spin and perform smooth arcing maneuvers. In some implementations, the locomotion subsystem includes sensors that provide feedback representing how quickly one or more of the wheels are turning. The robot can use this information to control its position and speed.

The control subsystems of the robot 100 include an effector subsystem 120 that is operable to manipulate objects in the robot's environment. In this example, the effector subsystem 120 includes a lift and one or more motors for controlling the lift. The effector subsystem 120 can be used to lift and manipulate objects in the robot's environment. The effector subsystem 120 can also be used as an input subsystem, which is described in more detail below.

The control subsystems of the robot 100 also include a robot head 130, which has the ability to tilt up and down and optionally side to side. On the robot 100, the tilt of the head 130 also directly affects the angle of a camera 150.

The presentation subsystems of the robot 100 include one or more electronic displays, e.g., electronic display 140, which can each be a color or a monochrome display. The electronic display 140 can be used to display any appropriate information. In FIG. 1, the electronic display 140 is presenting a simulated pair of eyes. The presentation subsystems of the robot 100 also include one or more lights 142 that can each turn on and off, optionally in multiple different colors.

The presentation subsystems of the robot 100 can also include one or more speakers, which can play one or more sounds in sequence or concurrently so that the sounds are at least partially overlapping.

The input subsystems of the robot 100 include one or more perception subsystems, one or more audio subsystems, one or more touch detection subsystems, one or more motion detection subsystems, one or more effector input subsystems, and one or more accessory input subsystems, to name just a few examples.

The perception subsystems of the robot 100 are configured to sense light from an environment of the robot. The perception subsystems can include a visible spectrum camera, an infrared camera, or a distance sensor, to name just a few examples. For example, the robot 100 includes an integrated camera 150. The perception subsystems of the robot 100 can include one or more distance sensors. Each distance sensor generates an estimated distance to the nearest object in front of the sensor.

The perception subsystems of the robot 100 can include one or more light sensors. The light sensors are simpler electronically than cameras and generate a signal when a sufficient amount of light is detected. In some implementations, light sensors can be combined with light sources to implement integrated cliff detectors on the bottom of the robot. When light generated by a light source is no longer reflected back into the light sensor, the robot 100 can interpret this state as being over the edge of a table or another surface.

The audio subsystems of the robot 100 are configured to capture from the environment of the robot. For example, the robot 100 can include a directional microphone subsystem having one or more microphones. The directional microphone subsystem also includes post-processing functionality that generates a direction, a direction probability distribution, location, or location probability distribution in a particular coordinate system in response to receiving a sound. Each generated direction represents a most likely direction from which the sound originated. The directional microphone subsystem can use various conventional beam-forming algorithms to generate the directions.

The touch detection subsystems of the robot 100 are configured to determine when the robot is being touched or touched in particular ways. The touch detection subsystems can include touch sensors, and each touch sensor can indicate when the robot is being touched by a user, e.g., by measuring changes in capacitance. The robot can include touch sensors on dedicated portions of the robot's body, e.g., on the top, on the bottom, or both. Multiple touch sensors can also be configured to detect different touch gestures or modes, e.g., a stroke, tap, rotation, or grasp.

The motion detection subsystems of the robot 100 are configured to measure movement of the robot. The motion detection subsystems can include motion sensors and each motion sensor can indicate that the robot is moving in a particular way. For example, a gyroscope sensor can indicate an orientation of the robot relative to the Earth's gravitational field. As another example, an accelerometer can indicate a direction and a magnitude of an acceleration.

The effector input subsystems of the robot 100 are configured to determine when a user is physically manipulating components of the robot 100. For example, a user can physically manipulate the lift of the effector subsystem 120, which can result in an effector input subsystem generating an input signal for the robot 100. As another example, the effector subsystem 120 can detect whether or not the lift is currently supporting the weight of any objects. The result of such a determination can also result in an input signal for the robot 100.

The robot 100 can also use inputs received from one or more integrated input subsystems. The integrated input subsystems can indicate discrete user actions with the robot 100. For example, the integrated input subsystems can indicate when the robot is being charged, when the robot has been docked in a docking station, and when a user has pushed buttons on the robot, to name just a few examples.

The robot 100 can also use inputs received from one or more accessory input subsystems that are configured to communicate with the robot 100. For example, the robot 100 can interact with one or more cubes that are configured with electronics that allow the cubes to communicate with the robot 100 wirelessly. Such accessories that are configured to communicate with the robot can have embedded sensors whose outputs can be communicated to the robot 100 either directly or over a network connection. For example, a cube can be configured with a motion sensor and can communicate an indication that a user is shaking the cube as an indication that the user is trying to interact with the robot.

The robot 100 can also use inputs received from one or more environmental sensors that each indicate a particular property of the environment of the robot. Example environmental sensors include temperature sensors and humidity sensors to name just a few examples.

One or more of the input subsystems described above may also be referred to as "sensor subsystems." The sensor subsystems allow a robot to determine when a user is paying attention to the robot, e.g., for the purposes of providing user input, using a representation of the environment rather than through explicit electronic commands, e.g., commands generated and sent to the robot by a smartphone application. The representations generated by the sensor subsystems may be referred to as "sensor inputs."

The robot 100 also includes computing subsystems having data processing hardware, computer-readable media, and networking hardware. Each of these components can serve to provide the functionality of a portion or all of the input and output subsystems described above or as additional input and output subsystems of the robot 100, as the situation or application requires. For example, one or more integrated data processing apparatus can execute computer program instructions stored on computer-readable media in order to provide some of the functionality described above.

The robot 100 can also be configured to communicate with a cloud-based computing system having one or more computers in one or more locations. The cloud-based computing system can provide online support services for the robot. For example, the robot can offload portions of some of the operations described in this specification to the cloud-based system, e.g., for determining behaviors, computing signals, and performing natural language processing of audio streams.

Figure 2:
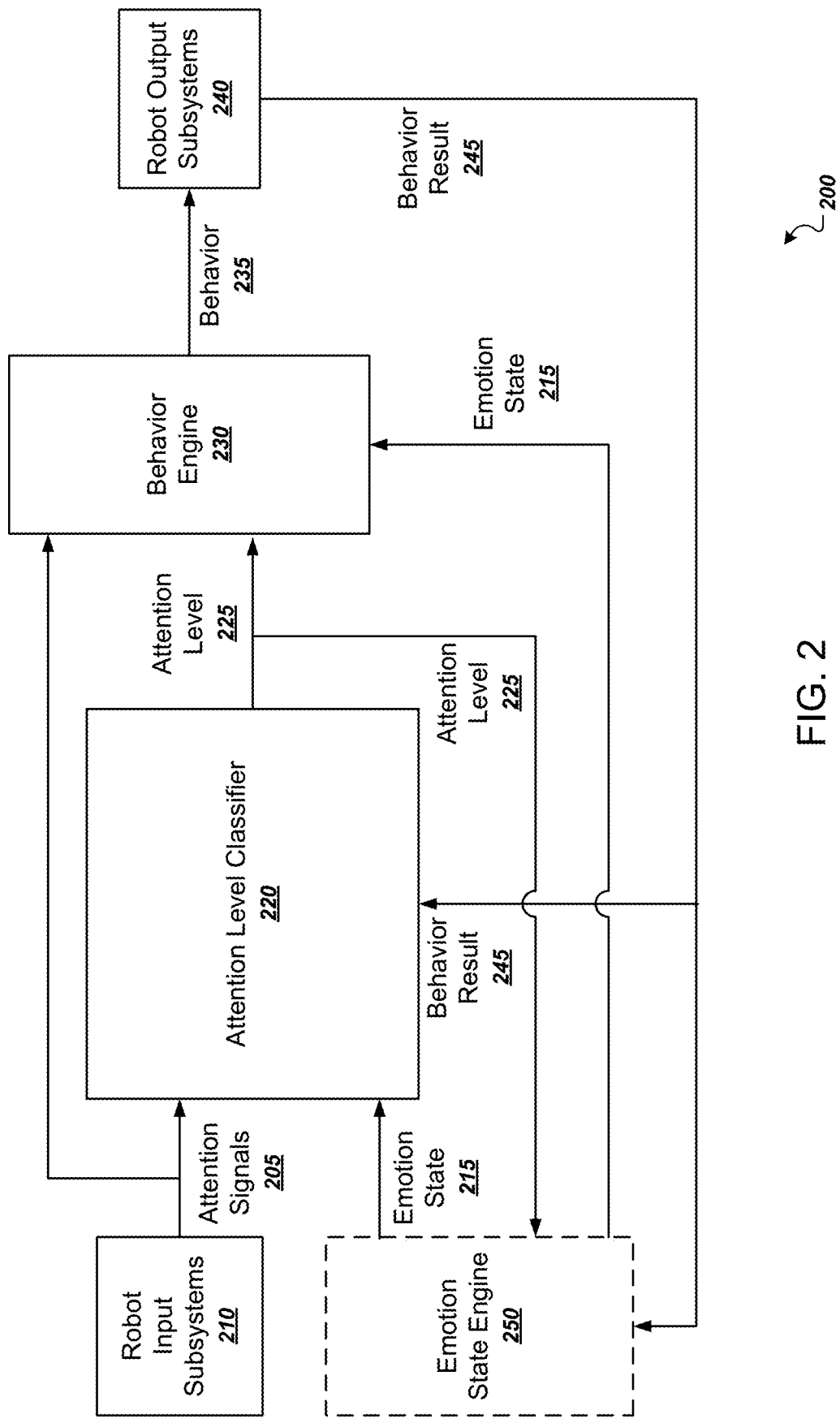
FIG. 2 illustrates the architecture of an example attention classification subsystem of a robot.

FIG. 2 illustrates the architecture of an example attention classification subsystem 200 of a robot. In general, an attention level classifier 220 uses the integrated robot input subsystems 210 to inform a behavior engine 230 about when the input subsystems 210 indicate that a user is paying attention to the robot. In response, the behavior engine 230 can select appropriate behaviors for the robot to perform, which can include performing behaviors to seek out additional user input.

The attention level classifier 220 can also optionally use an emotion state 215 maintained by an emotion state engine 250 in order to simulate emotional responses to particular sensor inputs. Using the emotion state in this way can enhance user engagement with the robot and can improve the user interface between users and the robot by making the robot's actions and responses readily understandable.

The attention level classifier 220 can also optionally use a behavior result 245 that indicates a result of a previously performed behavior. For example, if a robot performs a behavior to turn and search for faces and that behavior was successful, this information can influence the attention level 225 more strongly than mere sensor input indicating that a face has been detected. As another example, in response to a first attention level 225, the robot could perform a confirming behavior to ask "Hello?". This information can influence the attention level 225 more strongly than mere sensor input indicating that voice input has been detected.

Each of the attention signals 205 is computed from raw sensor inputs. Each signal corresponds to a different factor of multiple factors used to classify attention levels. Each signal is a value indicating a position between a minimum value and a maximum value for the corresponding factor.

Each signal can thus represent a likelihood of the raw sensor input indicating a particular occurrence in the environment of the robot for the corresponding factor. The particular occurrence can be, for example, a particular event, pattern, or environmental phenomenon. Each signal can, but need not, represent a probability or assume values of a continuous function. Some signals can be output by transformation functions, sigmoid functions, that provide a sharp but continuous transition between values indicating a low likelihood of a particular occurrence and values indicating a high likelihood of a particular occurrence.

The attention signals 205 can be generated by hardware, firmware, software, or some combination of these, and can be computed using a central processing unit of the robot, hardware of the sensors themselves, or some combination of these. In addition, some or all operations required for computing the signals may be performed by cloud-based computing systems. In other words, the robot can compute some signals locally and some signals in the cloud.

The attention level classifier 220 can be implemented as a machine learning system, a heuristics-based system, or some combination of these, that takes as input one or more attention signals 205 from the robot input subsystems 210. The attention level classifier 220 then uses the attention signals 205 compute an attention level 225 corresponding to the attention signals 205.

The attention level 225 generated by the attention level classifier 220 is a prediction about the likelihood that a user is paying attention to the robot based on the attention signals. The attention level 225 can represent a predicted likelihood of a user paying attention to the robot generally or a predicted likelihood of a the user providing a particular type of user input.

The attention level classifier 220 can use any appropriate heuristic or machine learning technique to generate the attention level 225 from the attention signals 205. For example, the attention level classifier 225 can be implemented as a support vector machine, a neural network, a naive Bayesian filter, or a decision tree, to name just a few examples.

The attention level 225 can be expressed as a numeric value. Alternatively, the attention level 225 can be expressed as identifiers of one or more of an enumerated number of attention levels. For example, the attention level can be expressed as a distribution over all possible attention levels.

The attention level classifier 220 is generally a real-time system, meaning that the attention level classifier 225 computes each attention level 225 as soon as sufficient attention signals 205 are available and without any intentional delays. A human user thus would not typically observe any delay between the occurrence of the sensor inputs and the attention level classifier 220 generating an attention level 225.

In some implementations, a user can access a cloud-based support system from a network-enabled user device in order to manually specify an attention level. For example, a user can use an interface from a network-enabled to device to manually set an always high attention level for the robot. This can be useful for a highly interactive context in which user input is expected, e.g., an interactive game or educational session.

A behavior engine 230 receives the attention level 225 and generates a corresponding behavior 235. In this specification, a "behavior" refers to a set of coordinated actions and optionally one or more responses that affect one or more output subsystems of the robot. The behavior engine 230 can then provide the behavior 235 to the robot output subsystems 240 for execution.

For example, if the attention level 225 indicates that a user is issuing a voice command, the behavior engine 230 can generate a behavior 235 having actions that include using a microphone to record the audio (or, e.g., extending an otherwise buffered recording), using networking subsystems to upload the audio to an NLP service, receiving the result, and performing an action corresponding to the result. The actions corresponding to the result can include performing a pre-scripted animation, playing a text-to-speech response, or manipulating an object in the environment. In many cases, the behavior 235 generated by the behavior engine 230 will be influenced by the original attention signals 205. For example, if a sound is detected coming from a particular direction, the behavior engine 230 can use the attention signals 205 to generate a behavior 235 that directs control subsystems to turn the robot in the direction from which the sound originated.

The behavior engine 230 can also be implemented as a machine learning system, a heuristics-based system, or some combination of these. For example, the behavior engine can be implemented as a manually-coded finite state machine. The behavior engine can also be implemented as a reinforcement learning system that is trained to maximize a cumulative reward associated with taking particular actions.

The system 200 can optionally include an emotion state engine 250 that maintains an emotion state for the robot. As shown in FIG. 2, the emotion state engine 250 operates as a feedback system that uses the previously generated attention level 225 and a previously generated behavior result 245 to update the emotion state 215. The attention level classifier 220 then uses the updated emotion state 215 to classify attention signals 205 into future attention levels.

The emotion state for a robot can be a multi-dimensional data structure, e.g., a vector or an array, that maintains respective values for each of multiple different aspects. Each aspect can represent a particular simulated emotional spectrum, with each value for each aspect representing a location within that simulated emotional spectrum.

For example, an example emotion state can have the following aspects: Happy, Calm, Brave, Confident, Excited, and Social, each of which may have a negative counterpart. Each aspect can have a predefined range of values between a minimum value and a maximum value, e.g., 0 to 1, 0 to 10, or −1 to 1, to name just a few examples. If the range is between −1 and 1, a value for the Happy aspect can for example simulate that the robot is sad (the negative counterpart for Happy) when the value is near −1 and happy when the value is near +1.

The aspects of the emotion state need not correspond to specifically identifiable human emotions. Rather, the emotion state can also include aspects that simulate other, more general or more specific spectrums that characterize robot behavior. For example, the emotion state can have aspects that include a Social aspect that represents how eager the robot is to interact with users generally, a Want-To-Play aspect that represents how eager the robot is to engage in gameplay with a user, and a Winning aspect that represents how competitive the robot is in games.

The emotion state engine 250 can update the emotion state 215 in response to changes in the attention level 225 as well as in response to the behavior result 245 that represents the outcome of executing a particular behavior. The emotion state thus brings about the simulated emotional or behavioral characteristics by affecting the output of the attention level classifier 220. This, in turn, results in changes in the actions of the robot.

The emotion state engine 250 can also update the emotion state 215 in response to other occurrences. For example, the emotion state engine 250 can receive a command from another application or subsystem that directly sets one or more values of the emotion state. For example, game-related emotion aspects can be altered by a game application to have particular preset values when the robot is participating in a game. And the altered values for the emotion state can still affect the attention level classification process, even though these some of the emotion aspects were altered outside the pipeline for classifying attention levels and selecting behaviors.

The multidimensionality of the emotion state along with the feedback loop, in which behaviors can influence the emotion state and the updated emotion state can influence behaviors, provide for complex and emergent behaviors that are not specifically pre-programmed or hard coded into the robot's software. For example, a sad or unexcited robot can require more forceful user input in order to get the robot's attention. Such behaviors can emerge through the training of the attention level classifier 220 rather than by the use of hard-coded heuristics.

An example of a progression through attention levels will now be described.

A robot initially generates a first attention level in which no attempts to get the robot's attention have been detected. This state may be referred to as the default attention state.

Next, the attention signals 205 indicate that a sound in the voice band of human speech has been detected. The attention signals 205 also indicate, through operation of a directional microphone subsystem, that the sound is coming from a direction behind the robot.

The attention level classifier 220 receives the attention signals 205 as well as a current emotion state 215 of the robot. The attention level classifier 220 in response generates a second attention level 225 corresponding to an intermediate attention state. The intermediate attention state is a state in which it is likely that a user is paying attention to the robot, but the nature of the attention needs to be confirmed by further evidence.

The attention level classifier provides the second attention level 225 to the behavior engine 230 of the robot. The behavior engine 230 uses the attention signals 205 and the second attention level 225 to generate a confirming behavior 235 that directs the robot to turn 180 degrees and to search for human faces in the vicinity of the sound direction. The behavior engine 230 provides the confirming behavior 235 to the robot output subsystems 240, causing the robot to execute actions of the generated confirming behavior. The robot output subsystems 240 generate a behavior result 245 representing the outcome of the confirming behavior 235.

The attention level classifier 220 also provides the second attention level 225 to the emotion state engine 250 of the robot. The emotion state engine 250 can use the second attention level 225, the behavior result 245, or both to update the emotion state of the robot.

For example, the transition to the second attention level 225 alone can be sufficient for the emotion state engine 250 to update the emotion state. For example, the emotion state engine 250 can increase the value of a Social aspect of the emotion state to reflect that the robot is now less lonely.

In addition, the behavior result 245 of turning toward the sound and searching for human faces can also cause the emotion state engine 250 to update the emotion state. For example, if the behavior result 245 reflects that humans were in fact detected in the direction of the sound, the emotion state engine 250 can further increase the value of the Social aspect of the emotion state to reflect that the robot is even less lonely. If the behavior result 245 reflects that eye contact was also detected, the emotion state engine 250 can even further increase the value of the Social aspect to reflect that the robot is less lonely.

Next, the attention level classifier 220 receives further attention signals 205 from the input subsystems 210 and possibly also the behavior result 245 of the behavior of turning and searching for human faces. The next set of attention signals 205 reflects that eye contact has been sustained for at least a threshold period of time.

The attention level classifier 220 uses this information along with the updated emotion state 215, which reflects that the robot feels less lonely than before, to generate a third attention level 225 corresponding to an active attention state. The active attention state is a state in which a user is actively providing user input.

The attention level classifier 220 provides the third attention level 225 to the behavior engine 230. The behavior engine 230 uses the third attention level 225 to generate a listening behavior 235 that directs the robot to upload any recently captured, buffered audio to an online NLP service and to process the result for to recognize speech input. In some implementations, the robot can continue streaming audio to the NLP service until it determines that a stopping condition has been reached.

The emotion state engine 250 receives the third attention level 225 and updates the emotion state of the robot. Because the third attention level 225 reflects that a user is actively providing input, the emotion state engine 250 can update the Lonely aspect to reflect that the robot is least lonely and possibly other states. For example, the third attention level 225 reflecting active user input can also result in the emotion state being updated for an Excited aspect, or any other appropriate aspect.

The emotion state engine 250 can also receive a behavior result 245 of the listening behavior. The behavior result 245 indicates that the user did issue a valid voice command that requested the robot to sing a song. In response, the emotion state engine 250 can update the emotion state to increase the Happy aspect.

This feedback loop of updating the emotion state in this way can have lingering effects on the behaviors of the robot. For example, if the values of the emotion state reflect that the robot is excited and not lonely, when the next sound is heard, the robot can jump from a default attention level straight to a high probability attention level. In other words, even if the attention signals 205 are exactly the same as they were previously, the updated emotion state can cause the robot to skip the intermediate attention levels and any corresponding searching and confirming behaviors.

As a counter-example, if the emotion state reflects that the robot is not excited or is sleepy, a user may have to be much more forceful to trigger a particular attention level. The robot can obtain this type of emotion state due to prolonged inactivity. As time passes, the emotion state engine can continually update one or more aspects of the emotion state to appropriately reflect that no one is paying attention to the robot.

These lingering effects on the behaviors of the robot can also make the robot more lifelike, as the robot's behavior moves away from the binary, on/off performance of behaviors exhibited by prior AI systems. This in turn increases user engagement and makes interacting with the robot more fun and intuitive. The lingering effects can also preserve battery power, network bandwidth, and cloud computing costs, by preventing the over-triggering of robot attempts to understand human speech any time the robot detects audio within the human speech band or from continually performing image or video processing to look for faces.

The emotion state can also make voice-based interactions more natural. In particular, the continued interaction with the robot can maintain an emotion state that reflects high levels of user engagement and attention, e.g., by having a high value for the "Social" aspect of the emotion state. In these situations, dialog with the robot becomes easier and more natural because the robot is more likely to immediately trigger voice recognition for any audio input, or remain in a "triggered" (i.e. streaming) state for the balance of the interaction. In other words, the emotion state allows the robot to bypass any keyword activation that signals that the user wants the robot to perform voice recognition.

As one example, a user can ask the robot to sing a song. In response to detecting likely voice voice audio and tonal qualities indicative of a question, the robot can open an audio stream with an online NLP service to understand the voice input. The robot can prompt the user for more information by playing an audio sound asking, "Which song?" The user can then state the name of a song. At this point, the continued interaction with the user can result in a high value for the "Social" aspect of the emotion state. This can cause the attention level classifier to generate an attention level 225 indicating an active and ongoing verbal interaction. Because of this, the behavior engine 230 can select a behavior 235 that results in a high value of the Social aspect of the emotion state, which can cause the attention level classifier to immediately send ongoing audio to an NLP service for voice recognition.

Figure 3:
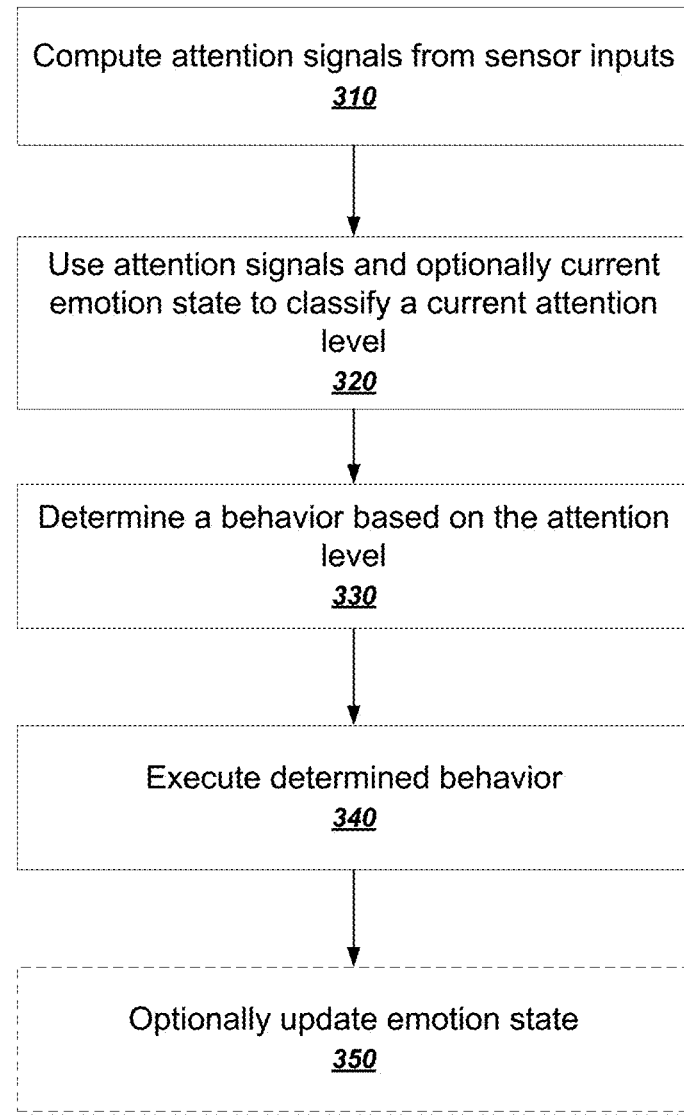
FIG. 3 is a flow chart of an example process for classifying an attention level based on sensor inputs.

FIG. 3 is a flow chart of an example process for classifying an attention level based on sensor inputs. The example process will be described as being performed by a robot programmed appropriately in accordance with this specification. For example, the robot 100 of FIG. 1, appropriately programmed, can perform the example process.

The robot computes attention signals from sensor inputs (310). The robot can obtain the sensor inputs using any appropriate combination of sensor subsystems described above. Each sensor subsystem generates a representation of the robot's environment that is particular to that sensor. For example, a camera can generate a color image of the environment, while a cliff sensor can generate an indication of whether or not surface-reflected light is detected.

The robot can then compute a variety of attention signals using the sensor inputs. Each attention signal can be represented as a numeric value that represents a likelihood of a particular phenomenon occurring in the environment. In some implementations, the attention signals are computed by individual classifiers that process the raw sensor inputs. The attention signals can thus have either a minimum value, e.g., 0, or a maximum value, e.g., 1.

Some attention signals can have multiple values. In particular, some attention signals can be associated with a detection and a direction. For example, one attention signal can indicate whether a face is detected and if so, in what direction the face is located. An attention signal can also indicate whether or not the face belongs to a recognized user that the robot has interacted with in the past, as well as possibly some information about commands the user issued.

The attention signals can include vision signals that rely on processing light or image data from one or more perception subsystems, audio signals that rely on processing audio data from one or more audio subsystems, touch signals that rely on processing data from touch detection subsystems, motion signals that rely on processing data from motion detection subsystems, and electronic signals that rely on processing data from electronic sensors or other electronic sources. The processing required for each of these signals can be performed by special purpose integrated hardware, software, or some combination of these.

The perception signals can be generated by processing light or image data to make a particular determination about the environment of the robot. The perception signals can include indications of whether a human generally, or a human face, or a human face of a known user, is recognized in captured image data, which makes it more likely that a user paying attention to the robot. The perception signals can also include an indication of whether a gaze is detected for at least a threshold amount of time, which also makes it more likely that a user is paying attention to the robot. The perception signals can also include an indication of whether human mouth movement is detected in captured image or video data, which can also make it more likely that a user is paying attention to the robot. And the perception signals can include a measure of overall room brightness or hue or a measure of change in room brightness or hue. A bright room makes it more likely that a user is paying attention to the robot, and a relatively fast transition from dark to light, e.g., due to turning on a light switch, can also make it more likely that a user is paying attention to the robot.

The audio signals can be generated by processing audio data and possibly also directional information from a directional microphone subsystem. The audio signals can include an indication of whether audio within the band of human speech has been received, which makes it more likely that a user is paying attention to the robot. The audio signals can also include an indication of whether particular keywords were recognized in the audio. For example, the robot can be programmed to respond to particular keywords that indicate that a user is attempting to provide user input. Detecting those keywords in the audio data makes it very likely that a user is paying attention to the robot.

The audio signals can also include a measure of overall background noise. A noisy room, which can indicate multiple people talking simultaneously or a noisy environment generally, e.g., a party, makes it less likely that any particular user is paying attention to the robot. In some implementations, the attention level classifier can be implemented to effectively turn off attention triggering if the overall background noise is sufficiently noisy, or keep highly attentive if the room is silent.

The touch signals can be generated by processing touch sensor data. The touch signals can include an indication of whether the robot is being touched or held, which makes it more likely that a user is paying attention to the robot. The touch signals can include an indication of whether the robot is being touched in a particular way. For example, the robot can compute a touch signal that indicates whether a user is petting the robot like a dog. The presence of this touch signal makes it more likely that a user is paying attention to the robot. Other example touch signals that are indicative of the robot being touched in a particular way include sustained touching for more than a threshold period of time, shaking the robot, or tapping the robot. The presence of any of these touch signals make it more likely that a user is paying attention to the robot. The touch signals can also include indications of forced component manipulations. For example, the robot can determine when the wheels of the robot are being forced along the ground, which is a situation that can indicate that a child is playing with the robot. The robot can also determine when its head or lift are being manipulated, which makes it more likely that a user is paying attention to the robot. The touch signals can also include contact sensor data that indicates that the robot is in a docking station, which makes it more likely that a user The motion signals can be generated by processing motion sensor data, which can include data generated by gyroscopes and accelerometers. The motion signals can include an indication of whether the robot has an unusual orientation, which can be an indication that a user is holding the robot in a particular way. The motion signals can also include an indication of whether the robot is experiencing accelerations, which can make it more likely that a user is paying attention to the robot. The accelerations can be indicative of a user playing with the robot, the robot being passed around among users, or the robot just having been picked up.

The electronic signals can be generated by processing data from electronic sensors or other electronic data. The electronic signals can be distinguished from explicit electronic instructions for the robot. Rather, the electronic signals represent a phenomenon of the robot's environment having an electronic origin. The electronic signals can include a measure of range to another robot or to a user device using, for example, Bluetooth low energy (BLE) signal strength, WiFi signal strength, or respective GPS locations. The electronic signals can also include an indication of whether or not the robot is connecting to a familiar WiFi network, which can be a WiFi network that the robot has connected to before or connected to before at least a threshold number of times. The electronic signals can also include an indication of whether a user device or a user device of a specific person is nearby. A user device, e.g., a smartphone or tablet computer, being nearby makes it more likely that a user is paying attention to the robot. The electronic signals can also include an indication of whether a user has taken a particular action within a companion smartphone application ("app"), e.g., opening the app or selecting a particular menu or mode, or is engaging with a website associated with the robot. The electronic signals can also include an indication of whether a user is interacting with an electronic accessory, e.g., a cube that can communicate with the robot. The electronic signals can also include an indication of a time of day. For example, users may be more likely to pay attention to the robot during typical waking hours rather than typical sleeping hours.

The attention signals can also include combination signals, which are higher-level combinations of lower-level attention signals. Although useful combinations of signals can be discovered during training of the attention level classifier, some hard-coded combinations can be particularly useful for classifying an attention level.

The combination signals can include whether a face is detected in the direction from which audio is coming, which makes it more likely that a user is paying attention to the robot. The combination signals can also include whether mouth movement has been detected in the direction from which audio is coming, which makes it more likely that a user is paying attention to the robot. The combination signals can also include whether the robot is being touched while also experiencing an acceleration, which makes it more likely that a user is paying attention to the robot. The combination of touch and acceleration can be particularly useful for indicating that the robot is being picked up or passed around as opposed to merely experiencing an acceleration due to falling off a table.

The combination signals can also include whether a light has been turned on in addition to acceleration being detected, which can indicate that a user has entered the room and picked the robot up. The combination signals can also include whether a light has been turned on while a particular keyword has been detected. The combination signals can also include whether a light has been turned on while the robot is connected to a familiar WiFi network. The combination signals can also include whether the sound of door opening is detected in combination with detecting a person within the door. The combination signals can also include detecting a face or mouth along with detecting a gaze suggesting eye contact with the robot. The combination signals can also include detecting a person waving at the robot while looking at the robot.

As described above, the robot can compute some signals locally, which may be referred to as local signals, e.g., using only the robot's integrated sensors and other integrated processing hardware; and some signals in the cloud, which may be referred to as cloud-based signals. In some implementations, the robot can activate and deactivate the computation of individual signals based on the current attention level of the robot. This can allow the robot to continually compute only signals that are cheap to compute when the robot is in lower attention levels and to only turn on computation of cloud-based signals or other expensive signals when the robot transitions to higher attention levels. This can preserve the robot's computing resources, e.g., battery life, processing power, and network bandwidth. For example, the robot can be programmed to recognize certain keywords using a locally computed audio signal. Recognizing only particular keywords is generally vastly cheaper than performing full natural language understanding. Therefore, the robot can routinely or continually recompute the locally computed audio signal to try to recognize particular keywords in captured audio. Then, when the attention level increases to indicate that a user is trying to provide a voice-based input to the robot, the robot can upload the audio stream to a cloud-based system to compute cloud-based signals based on the audio stream. The various signals and attention levels can thus form a hierarchy in which some signals are computed only for particular attention levels. For example, one example hierarchy relating to audio includes the following progression of ever-more expensive signals: 1) detecting audio, 2) detecting audio in the voice band of human speech, 3) detecting keywords in the captured audio, 4) performing cloud-based natural language understanding on the captured audio.

A user can also use a provided interface, e.g., through a cloud-based support system, to remotely control how the signals are activated and deactivated. For example, users could have access to settings to disable cloud streaming when the robot recognizes a particular person, e.g. a child. Or alternatively or in addition the settings could direct the robot to never stream data at certain times of the day or night, or to only stream data when it detects the presence of a specific phone, e.g. a parent's phone.

The robot uses the attention signals and optionally a current emotion state to generate a current attention level (320). Each of the attention signals can be used as input features to an attention level classifier. The attention level classifier can then generate a current attention level.

The attention level classifier can be implemented to generate a numeric attention level that is within a minimum attention level and a maximum attention level. In this case, attention levels closer to the maximum attention level correspond to situations in which the sensor inputs are more likely to indicate that a user is paying attention to the robot.

Alternatively or in addition, the attention level classifier can be implemented to generate an attention level that identifies one of multiple different enumerated attention levels. In this case, the attention levels need not be completely hierarchical. In other words, some attention levels can cause the robot to perform different behaviors, but neither strictly corresponds to a higher likelihood that a user is paying attention to the robot or attempting to get the robot's attention. For example, a first enumerated attention level can cause a robot to drive toward a sound, and a second enumerated attention level can cause a robot to turn toward the sound and possibly open an audio or video stream to a cloud-based service.

As described above, the attention level classifier can also use as input one or more features from a multidimensional emotion state maintained by the robot. For example, the robot can generate a vector having values for each aspect of the multidimensional emotion state and use the generated vector as an input feature for the attention level classifier.

The attention level classifier can be implemented using machine-learning techniques. This process is described in more detail below with reference to FIG. 4.

Alternatively or in addition, the attention level classifier can be implemented as a heuristics-based system that encodes, explicitly or implicitly, which combination of attention signals are sufficient to trigger a particular attention level. For example, as described above, each of the attention signals can be generated by individual classifiers, with each attention signal having either a first value indicating that a user paying attention to the robot or a second value indicating the opposite. In that case, a heuristics-based system can in some implementations count how many of the attention signals are indicative of a user paying attention to the robot.

The system can also assign different weights to different attention signals. The weights can be manually provided or learned by machine learning techniques. Some attention signals may on their own can be enough to trigger a particular attention level. For example, a first signal that indicates audio in the band of human speech has been detected, on its own, may not be enough for the system to trigger a particular attention level. But when combined with a second signal that indicates that eye contact is detected in the direction from which the audio originated may be enough for the system to trigger a particular attention level. On the other hand, a third signal that indicates that a particular keyword was detected in the captured audio can be enough on its own for the system to trigger the particular attention level.

The robot determines a behavior based on the generated attention level (330). The robot can use the generated attention level to determine whether or not a user is paying attention to the robot. If the user is not paying attention to the robot, the robot can continue doing what it was doing previously, which include performing specific tasks, playing games, or doing nothing at all, to name just a few examples.

If on the other hand, the robot determines that a user is paying attention to the robot, the robot can determine a behavior that acknowledges the existence of the user in some way. Such behaviors can include, for example, searching and confirming behaviors, understanding and acting behaviors, and user acknowledgement behaviors.

The searching and confirming behaviors are groups of coordinated actions that the robot can perform in order to gather more evidence about possible input the user may be providing. The searching and confirming behaviors generally require the attention level classifier to generating an attention level indicating at least the possibility of the sensor inputs indicating attention being activated.

The understanding and acting behaviors are groups of coordinated actions that the robot can perform in order to understand what input a user is providing and acting on that input. Naturally, the understanding and acting behaviors correspond generally to situations in which there is a greater likelihood of a user paying attention to robot.

Acknowledgement behaviors are groups of coordinated actions that the robot can perform to indicate to the user that the robot has detected the attention being paid to it. Acknowledgement behaviors can include displaying animated eye expressions, head nods, turns, and spoken phrases, to name just a few examples. For example, if the robot is performing a building project with blocks and determines that a user has started paying attention to the robot, the robot can perform a small acknowledgement behavior by turning toward the user, nodding its head, and saying, "hello" to the user, but otherwise continuing the building project. These types of acknowledgement behaviors make the robot more lifelike and encourage more user engagement.

The robot executes the determined behavior (340). As described above, the robot can provide the generated behavior to one or more output subsystems for execution. In response, the robot can generate a behavior result that represents an outcome of performing the behavior.

The robot optionally updates the emotion state (350). As described above, an emotion state engine can receive a the current attention level, the behavior result of the executed behavior, or both, and update the emotion state.

The robot can maintain the emotion state in local computer-readable media. The robot can also maintain the emotion state in a cloud-based computer system. This can allow the emotion state to persist across sessions in which the robot is turned on and even allows for the system to adjust the emotion state when the robot is completely turned off. For example, the emotion state can reflect increased loneliness and less happiness if a significant amount of time has passed since anyone paid attention to the physical robot.

The emotion state engine can maintain a mapping between particular behaviors, behavior results, and corresponding updates to the emotion state. Each mapping can be referred to as a behavior update rule. Then, when a particular behavior generates a particular behavior result, the emotion state engine can update one or more aspects of the emotion state according to a defined update in behavior update rule.

In some implementations, the emotion state engine maintains a set of tuples that each correspond to a particular behavior update rule. Each tuple identifies (i) a particular behavior, (ii) a particular behavior result, and (iii) an update to the emotion state.

The following example tuples illustrate example behavior update rules:

(behavior: LookForFaces, event: FaceDetected, update: increment "social" aspect)

(behavior: PickUpCube, event: CubeFail, update: decrement "calmness" aspect)

The first tuple identifies a behavior named "LookForFaces." The LookForFaces behavior can be a behavior that instructs the robot to move the robot head to scan up and down or left and right and then process any currently captured image data in order to detect faces in the image data.

The first tuple also identifies a behavior result named "FaceDetected." This behavior result represents the outcome in which a face is detected in currently captured image data.

The first tuple also identifies a corresponding update to the emotion state for this pattern. In this example, the first tuple represents incrementing the "social" aspect of the emotion state by a particular amount, e.g., by a predetermined constant.

The second tuple identifies a behavior named "PickUpCube." The PickUpCube behavior can be a behavior that instructs the robot to pick up a previously recognized cube in the robot's environment.

The second tuple also identifies a behavior result named, "CubeFail," which represents failure to successfully pick up the cube.

The second tuple also identifies a corresponding update to the emotion state. In this example, the second tuple represents decrementing the "calmness" aspect of the emotion state by a particular amount, e.g., by a predetermined constant. The update element in a tuple of a behavior update rule can specify updates to one or more emotion aspects. Alternatively, updates to multiple emotion aspects can be specified with separate behavior update rules that each share the same initial behavior and behavior result elements. For example, the following behavior update rule could also be executed when the behavior is PickUpCube and the result is CubeFail:

(behavior: PickUpCube, event: CubeFail, update: decrement "happy" aspect)

The behavior update rules can also include update rules relating to a user's physical interaction with the robot. For example, if the robot is picked up, the robot can decrease its calmness aspect. If the robot gets a fist bump from a user, the robot can increase its social aspect. If the robot gets turned upside down or on its side, the robot can decrease its calmness aspect.

The behavior update rules can also include updates rules relating to the robot's interaction with its environment. For example, if the robot successfully builds a stack of blocks, the robot can increment its happy aspect. If the robot builds an even more complicated structure, e.g., a pyramid, the robot can increment its happy aspect by an even greater amount. If the robot drives to the edge of a table and detects a cliff, the robot can increment its scared aspect.

The emotion state engine can also maintain a mapping between previous and current attention levels and corresponding updates to the emotion state. Each mapping can be referred to as an attention level update rule. Then, when a first attention level transitions into a second attention level, the emotion state engine can update one or more aspects of the emotion state according to the defined update in the attention level update rule.

The following example tuples illustrate example attention level update rules. The first tuple illustrates using a numeric attention level, while the second tuple illustrates using an enumerated attention level.

(previous: 0.2, current: 0.8, update: increment "excited" aspect)

The first tuple identifies a previous attention level as the value 0.2 and a current attention level as the value 0.8. The first tuple also identifies a corresponding update to the emotion state for this pattern, which is to increment the "excited" aspect of the emotion state. The attention level update rules could alternatively represent deltas between the attention level rather than the actual before and after values themselves.

The robot can repeat the example process continually. Thus, after either of executing the determined behavior (step 340), or optionally updating the emotion state (step 350), the robot can return to step 310 to compute attention signals from sensor inputs. In some implementations, the robot performs these steps at least partially in parallel. In other words, while executing the determined behavior, the robot can at the same time be computing a next set of attention signals from the sensor inputs. In other words, the robot need not wait to execute the determined behavior, update the emotion state, or capture user input in order to begin processing the next sensor inputs.

A number of specific use cases for using an attention level classifier will now be described.

First, a user walks into a room, a robot detects the user and also detects that the user is looking at the robot. As a result, the robot's attention level changes and waits for user voice input. The user then asks "What time is it?" The robot chooses a behavior that causes the robot to perform NLP on the user input. In this case, the robot knew to perform NLP processing even though no wake word was spoken first.

Second, a user is playing a game with a robot. The user is looking away from the robot and says, "Stop." In this case, the robot still recognizes the command "stop" even though no wake word was spoken because of the immediately previous interaction, which can affect the signals computed from sensor inputs, the emotion state, or both.

Third, a user beings playing with the robot. As a result, the robot's attention level changes. In response to this change, the robot chooses a behavior that changes the length of a rolling audio buffer because user input in the near future is likely.

Fourth, the clock switches to 5:00 p.m., which is a time that the robot has been configured to recognize as a likely time that users will pay attention to the robot. As a result, the attention level of the robot changes in anticipation of a user coming home from work and playing with the robot. As a result, the robot selects an action that adjusts a confidence threshold for wake words.

Fifth, Aunt Jane loves to play with the robot when she comes over, and so the robot has registered Aunt Jane as a user that is a recognized user. The robot detects through BLE communication that a phone having an identifier associated with Aunt Jane has just come into range. As a result, the attention level of the robot changes, and the robot chooses a behavior that awaits input from Aunt Jane. On the other hand, Uncle John may not be a recognized user. Therefore, if the robot detects that a phone having an identifier of an unrecognized user, the robot may not choose a behavior that awaits user input.

Figure 4:
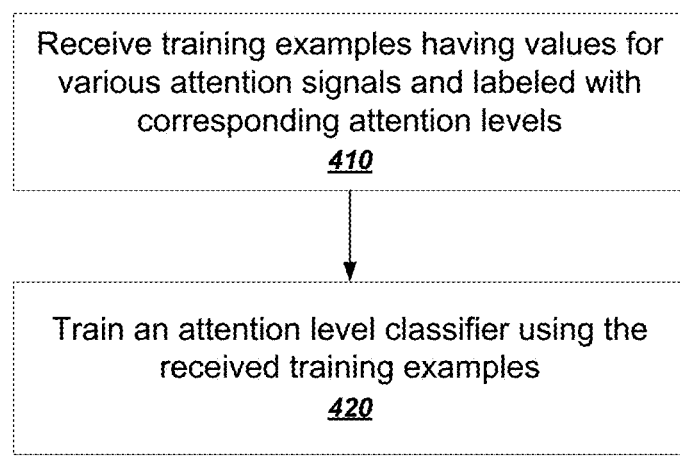
FIG. 4 is a flow chart of an example process for training an attention level classifier.

FIG. 4 is a flow chart of an example process for training an attention level classifier. For convenience, the example process will be described as being performed by a system of one or more computers, located in one or more locations, and programmed appropriately in accordance with this specification.

The system receives training examples having values for various attention signals and being labeled with corresponding attention levels (410).

The system can generate the training examples from sessions of physical robots being used by multiple users. For each of multiple time periods, the robots can record the values of one or more of the attention signals. Then, each training example can be manually labeled with an indication of whether or not a user was paying attention to the robot for that particular set of attention signals.

The system trains an attention level classifier using the received training examples (420). The system can use any appropriate machine learning technique to train the attention level classifier, e.g., using a support vector machine or a neural network.

After the attention level classifier has been trained by the system, the model parameters generated during training can be deployed on an actual physical robot for use in classifying attention levels. If an improved model is trained later, that model can be deployed to an actual physical robot to replace its previous model and improve attention classification performance. The model can also be continuously updated while running on the robot in response to additional data which is received. For example, the model might falsely decide that the level of attention is high enough to open an audio stream to a cloud NLP server (this is often called a false positive). Then, the server may determine that no actual speech is being directed towards the robot. This could cause an update in the model to make it less likely to repeat the same mistake in the future.

Alternatively or in addition, the attention level classifier, the behavior engine, or both together, can be implemented as a reinforcement learning system that is trained to maximize a cumulative reward associated with particular sensor inputs and emotion states. During training, a reward value can be provided that encourages the robot to automatically learn to do correct behaviors in response to inputs. For example, in response to a particular action that includes streaming data to the cloud for more analysis in response to particular inputs, a reward value can be manually provided indicating whether or not that was the correct action for the inputs.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For a robot to be configured to perform particular operations or actions means that the system has installed on it software, firmware, hardware, or a combination of them that in operation cause the robot to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a robot, a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a robot comprising:
a body and one or more physically moveable components;
one or more sensor subsystems that are configured to generate sensor inputs comprising respective representations of an environment of the robot;
one or more processors; and one or more storage devices storing instructions that are operable, when executed by the one or more processors, to cause the robot to perform operations comprising:
  computing a plurality of attention signals from the sensor inputs, wherein each attention signal corresponds to one factor of multiple factors for classifying an attention level using an attention level classifier of the robot according to the sensor inputs,
  providing the plurality of attention signals as input to the attention level classifier to generate an attention level
  determining that a user is paying attention to the robot based on the generated attention level;
  in response, determining a behavior to execute based on the current attention level, wherein a behavior comprises one or more coordinated actions to be performed by the robot, and
  executing the determined behavior including performing the one or more coordinated actions.

Embodiment 2 is the robot of embodiment 1, wherein executing the determined behavior comprises uploading a stream of received audio for natural language processing without having received a wake word.

Embodiment 3 is the robot of any one of embodiments 1-2, wherein the attention level represents a predicted likelihood that a user is paying attention to the robot based on the sensor inputs.

Embodiment 4 is the robot of any one of embodiments 1-3, wherein the behavior causes the robot present an eye animation on a display to acknowledge the user.

Embodiment 5 is the robot of any one of embodiments 1-4, wherein determining a behavior to execute based on the current attention level comprises determining a physical behavior to execute, and wherein executing the determined physical behavior effects a physical movement of one or more of the physically moveable components of the robot.

Embodiment 6 is the robot of embodiment 5, wherein the one or more sensor subsystems comprise an audio subsystem configured to capture audio from the environment of the robot and to determine a direction from which the audio originated,
  and wherein the determined physical behavior comprises one or more actions directing the robot to turn toward the direction from which the audio originated.

Embodiment 7 is the robot of embodiment 5, wherein the one or more sensor subsystems comprise an audio subsystem configured to capture audio from the environment of the robot and to determine a direction from which the audio originated,
  and wherein the determined physical behavior comprises one or more actions directing the robot to drive forward in the direction from which the audio originated.

Embodiment 8 is the robot of any one of embodiments 1-7, wherein the one or more sensor subsystems comprise a perception subsystem configured to sense light from an environment of the robot, and
  wherein the attention signals comprise:
    a first indication of whether a human face is recognized in image data captured by the perception subsystem,
    a second indication of whether a gaze is detected for at least a threshold amount of time in image data captured by the perception subsystem, or
    a third indication of whether mouth movement is detected in image data captured by the perception subsystem.

Embodiment 9 is the robot of embodiment 8, wherein the first indication is an indication of whether a human face of a known user is recognized.

Embodiment 10 is the robot of any one of embodiments 1-9, wherein the one or more sensor subsystems comprise a perception subsystem configured to sense light from an environment of the robot and an audio subsystem configured to capture audio from the environment of the robot and to determine a direction from which the audio originated, and
  wherein the attention signals comprise:
    a first indication of whether a human face is recognized in image data captured by the perception subsystem in a direction from which audio data has been captured by the audio subsystem,
    a second indication of whether a gaze is detected in image data captured by the perception subsystem in a direction from which audio data has been captured by the audio subsystem, or
    a third indication of whether mouth movement is detected in image data captured by the perception subsystem in a direction from which audio data has been captured by the audio subsystem.

Embodiment 11 is the robot of any one of embodiments 1-10, wherein the one or more sensor subsystems comprise a touch detection subsystem and wherein the attention signals comprise a touch signal that indicates whether the robot is being touched by a user.

Embodiment 12 is the robot of any one of embodiments 1-11, wherein the one or more sensor subsystems comprise a touch detection subsystem and a movement detection subsystem, and wherein the attention signals comprise a signal that indicates whether the robot has been picked up based on a first indication that the robot is being touched by a user according to the touch detection subsystem and a second indication that the robot has experienced movement according to the movement detection subsystem.

Embodiment 13 is the robot of any one of embodiments 1-12, wherein the operations comprise:
  maintaining a multidimensional emotion state of the robot, wherein the emotion state comprises respective values for each of a plurality of aspects; and
  providing the multidimensional emotion state as input to the attention level classifier to generate the current attention level for the robot.

Embodiment 14 is the robot of any one of embodiments 1-13, wherein the operations comprise:
  maintaining a collection behavior update rules, wherein each behavior update rule is a mapping between a behavior, a behavior result, and an update to a particular aspect of the emotion state;
  receiving a behavior result that represents an outcome of executing the determined behavior;
  determining that a particular behavior update rule in the collection of behavior update rules includes the determined behavior and the behavior result; and
  in response, updating the emotion state according to an update defined in the particular behavior update rule.

Embodiment 15 is the robot of any one of embodiments 1-14, wherein the operations comprising:
  maintaining a collection of attention level update rules, wherein each attention level update rule is a mapping between a first attention level, a second attention level, and an update to a particular aspect of the emotion state;
  receiving a second attention level generated by the attention level classifier;

determining that a particular attention level update rule in the collection of attention level update rules includes the first attention level and the second attention level; and in response, updating the emotion state according to an update defined in the particular attention level update rule.

Embodiment 16 is an apparatus comprising:

one or more sensor subsystems that are configured to generate sensor inputs comprising respective representations of an environment;

one or more processors; and one or more storage devices storing instructions that are operable, when executed by the one or more processors, to cause the apparatus to perform operations comprising:

computing a plurality of attention signals from the sensor inputs, wherein each attention signal corresponds to one factor of multiple factors for classifying an attention level using an attention level classifier according to the sensor inputs, providing the plurality of attention signals as input to the attention level classifier to generate an attention level determining that a user is paying attention to the apparatus based on the generated attention level;

in response, determining a behavior to execute based on the current attention level, wherein a behavior comprises one or more coordinated actions to be performed by the apparatus, and executing the determined behavior including performing the one or more coordinated actions.

Embodiment 17 is the apparatus of embodiment 16, wherein executing the determined behavior comprises uploading a stream of received audio for natural language processing without having received a wake word.

Embodiment 18 is the apparatus of any one of embodiments 16-17, wherein the attention level represents a predicted likelihood that a user is paying attention to the apparatus based on the sensor inputs.

Embodiment 19 is the apparatus of any one of embodiments 16-18, wherein the one or more sensor subsystems comprise a perception subsystem configured to sense light from an environment of the robot, and wherein the attention signals comprise:

a first indication of whether a human face is recognized in image data captured by the perception subsystem, a second indication of whether a gaze is detected for at least a threshold amount of time in image data captured by the perception subsystem, or a third indication of whether mouth movement is detected in image data captured by the perception subsystem.

Embodiment 20 is a system comprising:

one or more sensor subsystems that are configured to generate sensor inputs comprising respective representations of an environment;

a robot comprising:

a body and one or more physically moveable components, one or more processors, and one or more storage devices storing instructions that are operable, when executed by the one or more processors, to cause the robot to perform operations comprising:

computing a plurality of attention signals from the sensor inputs, wherein each attention signal corresponds to one factor of multiple factors for classifying an attention level using an attention level classifier of the robot according to the sensor inputs, providing the plurality of attention signals as input to the attention level classifier to generate an attention level determining that a user is paying attention to the robot based on the generated attention level;

in response, determining a behavior to execute based on the current attention level, wherein a behavior comprises one or more coordinated actions to be performed by the robot, and executing the determined behavior including performing the one or more coordinated actions.

Embodiment 21 is the system of embodiment 20, wherein the one or more sensor subsystems comprise a network-enabled user device configured to generate one or more of the sensor inputs.

Embodiment 22 is a method comprising the operations performed by the robot of any one of embodiments 1-15.

Embodiment 23 is a method comprising the operations performed by the apparatus of any one of embodiments 16-19.

Embodiment 24 is a method comprising the operations performed by the system of any one of claims 20-21.

Embodiment 25 is a computer storage medium encoded with a computer program, the program comprising instructions that are operable, when executed by data processing apparatus, to cause the data processing apparatus to perform the operations of any one of embodiments 1-21.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A robot comprising:
a body and one or more physically moveable components;
one or more sensor subsystems that are configured to generate sensor inputs comprising respective representations of an environment of the robot;
one or more processors; and
one or more storage devices storing instructions that are operable, when executed by the one or more processors, to cause the robot to perform operations comprising:
computing a plurality of attention signals from the sensor inputs, wherein each attention signal corresponds to one factor of multiple factors for classifying an attention level using an attention level classifier of the robot according to the sensor inputs,
providing the plurality of attention signals as input to the attention level classifier to generate an attention level
determining that a user is paying attention to the robot based on the generated attention level;
in response, determining a behavior to execute based on the current attention level, wherein a behavior comprises one or more coordinated actions to be performed by the robot, and
executing the determined behavior including performing the one or more coordinated actions.

2. The robot of claim 1, wherein executing the determined behavior comprises uploading a stream of received audio for natural language processing without having received a wake word.

3. The robot of claim 1, wherein the attention level represents a predicted likelihood that a user is paying attention to the robot based on the sensor inputs.

4. The robot of claim 1, wherein the behavior causes the robot present an eye animation on a display to acknowledge the user.

5. The robot of claim 1, wherein determining a behavior to execute based on the current attention level comprises determining a physical behavior to execute, and wherein executing the determined physical behavior effects a physical movement of one or more of the physically moveable components of the robot.

6. The robot of claim 5, wherein the one or more sensor subsystems comprise an audio subsystem configured to capture audio from the environment of the robot and to determine a direction from which the audio originated,
and wherein the determined physical behavior comprises one or more actions directing the robot to turn toward the direction from which the audio originated.

7. The robot of claim 5, wherein the one or more sensor subsystems comprise an audio subsystem configured to capture audio from the environment of the robot and to determine a direction from which the audio originated,
and wherein the determined physical behavior comprises one or more actions directing the robot to drive forward in the direction from which the audio originated.

8. The robot of claim 1, wherein the one or more sensor subsystems comprise a perception subsystem configured to sense light from an environment of the robot, and
wherein the attention signals comprise:
a first indication of whether a human face is recognized in image data captured by the perception subsystem,
a second indication of whether a gaze is detected for at least a threshold amount of time in image data captured by the perception subsystem, or
a third indication of whether mouth movement is detected in image data captured by the perception subsystem.

9. The robot of claim 8, wherein the first indication is an indication of whether a human face of a known user is recognized.

10. The robot of claim 1, wherein the one or more sensor subsystems comprise a perception subsystem configured to sense light from an environment of the robot and an audio subsystem configured to capture audio from the environment of the robot and to determine a direction from which the audio originated, and
wherein the attention signals comprise:
a first indication of whether a human face is recognized in image data captured by the perception subsystem in a direction from which audio data has been captured by the audio subsystem,
a second indication of whether a gaze is detected in image data captured by the perception subsystem in a direction from which audio data has been captured by the audio subsystem, or
a third indication of whether mouth movement is detected in image data captured by the perception subsystem in a direction from which audio data has been captured by the audio subsystem.

11. The robot of claim 1, wherein the one or more sensor subsystems comprise a touch detection subsystem and wherein the attention signals comprise a touch signal that indicates whether the robot is being touched by a user.

12. The robot of claim 1, wherein the one or more sensor subsystems comprise a touch detection subsystem and a movement detection subsystem, and wherein the attention signals comprise a signal that indicates whether the robot has been picked up based on a first indication that the robot is being touched by a user according to the touch detection subsystem and a second indication that the robot has experienced movement according to the movement detection subsystem.

13. The robot of claim 1, wherein the operations comprise:
maintaining a multidimensional emotion state of the robot, wherein the emotion state comprises respective values for each of a plurality of aspects; and
providing the multidimensional emotion state as input to the attention level classifier to generate the current attention level for the robot.

14. The robot of claim 1, wherein the operations comprise:
maintaining a collection behavior update rules, wherein each behavior update rule is a mapping between a behavior, a behavior result, and an update to a particular aspect of the emotion state;
receiving a behavior result that represents an outcome of executing the determined behavior;
determining that a particular behavior update rule in the collection of behavior update rules includes the determined behavior and the behavior result; and
in response, updating the emotion state according to an update defined in the particular behavior update rule.

15. The robot of claim 1, wherein the operations comprising:
maintaining a collection of attention level update rules, wherein each attention level update rule is a mapping between a first attention level, a second attention level, and an update to a particular aspect of the emotion state;

receiving a second attention level generated by the attention level classifier;

determining that a particular attention level update rule in the collection of attention level update rules includes the first attention level and the second attention level; and in response, updating the emotion state according to an update defined in the particular attention level update rule.

16. An apparatus comprising:

one or more sensor subsystems that are configured to generate sensor inputs comprising respective representations of an environment;

one or more processors; and one or more storage devices storing instructions that are operable, when executed by the one or more processors, to cause the apparatus to perform operations comprising:

computing a plurality of attention signals from the sensor inputs, wherein each attention signal corresponds to one factor of multiple factors for classifying an attention level using an attention level classifier according to the sensor inputs, providing the plurality of attention signals as input to the attention level classifier to generate an attention level determining that a user is paying attention to the apparatus based on the generated attention level;

in response, determining a behavior to execute based on the current attention level, wherein a behavior comprises one or more coordinated actions to be performed by the apparatus, and executing the determined behavior including performing the one or more coordinated actions.

17. The apparatus of claim 16, wherein executing the determined behavior comprises uploading a stream of received audio for natural language processing without having received a wake word.

18. The apparatus of claim 16, wherein the attention level represents a predicted likelihood that a user is paying attention to the apparatus based on the sensor inputs.

19. The apparatus of claim 16, wherein the one or more sensor subsystems comprise a perception subsystem configured to sense light from an environment of the robot, and wherein the attention signals comprise:

a first indication of whether a human face is recognized in image data captured by the perception subsystem, a second indication of whether a gaze is detected for at least a threshold amount of time in image data captured by the perception subsystem, or a third indication of whether mouth movement is detected in image data captured by the perception subsystem.

20. A system comprising:

one or more sensor subsystems that are configured to generate sensor inputs comprising respective representations of an environment;

a robot comprising:

a body and one or more physically moveable components, one or more processors, and one or more storage devices storing instructions that are operable, when executed by the one or more processors, to cause the robot to perform operations comprising:

computing a plurality of attention signals from the sensor inputs, wherein each attention signal corresponds to one factor of multiple factors for classifying an attention level using an attention level classifier of the robot according to the sensor inputs, providing the plurality of attention signals as input to the attention level classifier to generate an attention level determining that a user is paying attention to the robot based on the generated attention level;

in response, determining a behavior to execute based on the current attention level, wherein a behavior comprises one or more coordinated actions to be performed by the robot, and executing the determined behavior including performing the one or more coordinated actions.

21. The system of claim 20, wherein the one or more sensor subsystems comprise a network-enabled user device configured to generate one or more of the sensor inputs.

* * * * *